O. C. RIFE.
Ventilators and Cinder and Dust-Guards for Car-Windows.

No. 140,541. Patented July 1, 1873.

WITNESSES
Cha. B. Steele
Phill Heusi

INVENTOR.
Obed C. Rife,
Chipman Hosmer & Co,
Attys.

UNITED STATES PATENT OFFICE.

OBED C. RIFE, OF NORTH MANCHESTER, INDIANA.

IMPROVEMENT IN VENTILATORS AND CINDER AND DUST GUARDS FOR CAR-WINDOWS.

Specification forming part of Letters Patent No. 140,541, dated July 1, 1873; application filed April 26, 1873.

*To all whom it may concern:*

Be it known that I, OBED C. RIFE, of North Manchester, in the county of Wabash and State of Indiana, have invented a new and valuable Improvement in Self-Acting or Adjustable Vacuum-Ventilator, Cinder and Dust Guard to Car-Windows; and I do hereby declare that the following is a full, clear, and exact description of the construction and operation of the same, reference being had to the annexed drawings making a part of this specification, and to the letters and figures of reference marked thereon.

Figure 1:
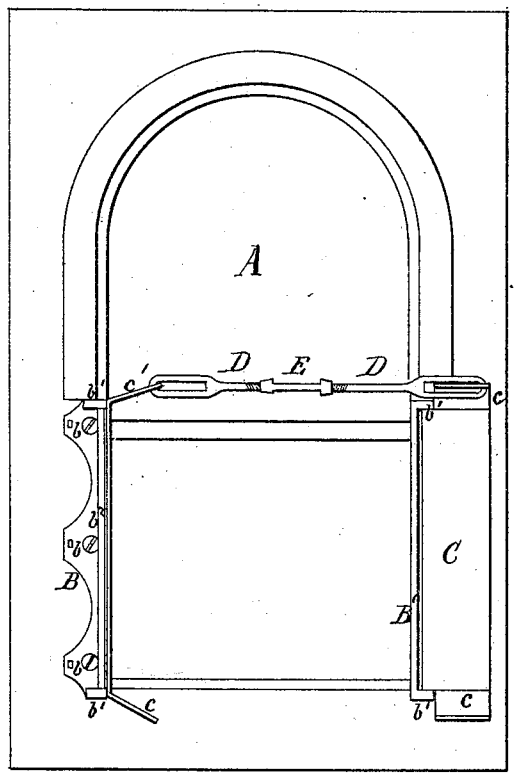
Figure 2:
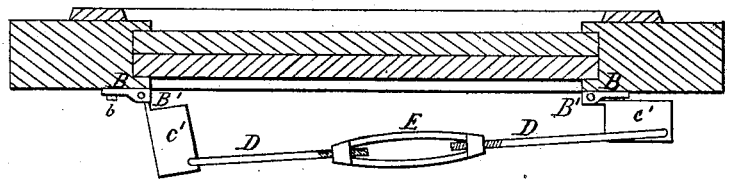
Figure 3:
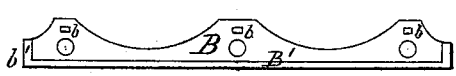

Figure 1 of the drawings is a representation of a front view of my cinder and dust guard applied to the window of a steam-car. Fig. 2 is a horizontal cross-section of the car-window and a top view of the dust-guard. Fig. 3 is a detached view of a plate to which the dust-guard is hinged.

My invention relates to an improved construction of a cinder and dust guard for the window of a railroad car, by which the operation of it is facilitated, the objectionable noise caused by the act of reversing abated, and by which the obstruction of sight by certain parts of it is avoided.

A represents a car-window with the lower sash raised. At either side of the window I attach to the car a plate, B, with sockets $b$ at the end furthest from the window. Said plate is provided at both ends with lugs $b^1$ $b^1$, for the reception of a pivot-rod, $b^2$, to which the fender C is attached, so that it may freely swing between the said lugs. The crevice between the fender C and the plate B is covered by the angular rib B' on the said plate, to prevent leakage. The slamming of the fender against the side of the car is prevented by pieces of soft rubber inserted into the sockets $b$, which project sufficiently above the plate B. The fender C is also provided with deflectors $c$ $c'$, by which the air-currents above and below the fender are compelled to change their courses away from the open window. The fenders on both sides are coupled with a double adjustable connecting-rod attached either to the upper deflectors $c'$ $c'$, or to the lower deflectors $c$ $c$. This connecting-rod consists of two rods, D D, which are hooked, hinged, or pivoted to the said deflectors, and connected with each other by a swivel-nut, E, with right-handed screw-thread at one end and left-handed screw-thread at the other, to make the length of the connecting-rod adjustable in a short time and with convenience.

The upper and lower deflectors are an indispensable improvement of the fenders, and without them the fenders cannot operate perfectly.

The air-current, which is caused by the motion of the cars, and which strikes the fenders, moves them in such manner that the forward fender attains a position at about a right angle to the center line of the car, whereby the fender on the other side of the window is kept against the rubbers in the plate B, through the action of the connecting-rod above mentioned.

The forward fender thus opposes the passage of air most effectually, and creates thereby a rarefaction of air on the side toward the car-window, which is the cause of the air-current from the car through the window.

This latter air-current is not powerful enough, however, to resist the momentum of those cinders, which are carried around the edges of the fender.

The deflectors break the force of the air-currents at the upper and lower edges, prevent the formation of eddies, which are generally the collectors of dust and cinders, and give the said air-currents a direction passing entirely away from the aperture of the raised car-window. The length of the coupled rods D D may be adjusted at pleasure and without danger to the operator, no matter how great the pressure of the air-current on the forward fender may be.

What I claim as my invention, and desire to secure by Letters Patent, is—

1. The combination of the plate B having angular rib B', the sockets $b$, and the fender C having the deflectors $c'$ $c$, substantially as specified.

2. In a deflector for railroad cars, the plate

B, having at each end the lugs $b'\ b'$ for the reception of a pivot-rod of a fender, and the sockets $b$ provided with rubber, substantially as and for the purposes set forth.

3. The fender C constructed with the deflectors $c\ c'$, substantially as specified, and for the purpose mentioned.

In testimony that I claim the above I have hereunto subscribed my name in the presence of two witnesses.

OBED C. RIFE.

Witnesses:
 J. M. BURDGE,
 CALLIE BURDGE.